United States Patent [19] [11] 3,971,692
Anderson [45] July 27, 1976

[54] RETRO-REFLECTIVE MATERIALS

[76] Inventor: Nigel I. Anderson, Morgenzicht, Sloane St., Witkoppen, Transvaal, South Africa

[22] Filed: July 30, 1974

[21] Appl. No.: 493,132

[30] Foreign Application Priority Data
July 2, 1974 South Africa......................... 74/4273

[52] U.S. Cl.................................. 156/241; 40/135; 427/163; 427/199; 427/250; 427/282; 428/406
[51] Int. Cl.²........................................... B44C 1/00
[58] Field of Search............ 156/241; 427/163, 250, 427/199, 282; 40/135, 205; 428/406

[56] References Cited
UNITED STATES PATENTS

| | | | |
|---|---|---|---|
| 2,143,946 | 1/1939 | Hunter | 427/163 |
| 2,592,882 | 4/1952 | Fisher et al. | 40/135 |
| 3,005,382 | 10/1961 | Weber | 40/205 |
| 3,036,928 | 5/1962 | Poole | 427/163 |
| 3,286,604 | 11/1966 | de Vries | 427/163 |
| 3,405,025 | 10/1968 | Goldman | 40/135 |
| 3,708,378 | 1/1973 | Tung | 40/135 |
| 3,877,786 | 4/1975 | Booras | 40/135 |

*Primary Examiner*—Edward G. Whitby

[57] ABSTRACT

Retro-reflective material is made by applying a monolayer of transparent glass beads to a tacky coating formed on a carrier sheet, coating exposed parts of the beads with a reflective material such as aluminium, and embedding the reflectively coated parts of the beads in an adhesive coating on a backing member. The carrier sheet is then stripped off. The thickness of the adhesive coating on the backing member is less than the typical diameter of the beads, and the thickness of the tacky coating on the carrier sheet is less than that of the adhesive on the backing member. In some cases screens or stencils are interposed between the carrier sheet and the backing member. Products resulting from these processes are described.

30 Claims, No Drawings

RETRO-REFLECTIVE MATERIALS

This invention relates to retro-reflective materials employing small spherical glass beads sometimes known as Ballotini.

The use of small glass beads for retro-reflection is well known and they are extensively utilised, for example mixed into or applied on top of roadmarking paint in order to reflectorise the road lines and make them more clearly visible to traffic. The beads are commercially available in various size ranges and it is common to classify them by size by referring to a range within which 90 percent by weight of the beads of any particular sample fall. In this specification and its claims the term "nominal diameter range" in relation to these beads is used to mean such a range incorporating at least 90 percent by weight of the beads, and references to dimensions less than the nominal diameter range are to be taken as references to dimensions less than the lower limit of such a range.

Light rays entering the front surface of a transparent glass sphere are refracted to a comparatively concentrated area on the back surface of the sphere, approximately where the axis through the centre of the sphere and the light source intersects the back surface of the sphere. Portion of the light reflected from the back surface of the sphere is then again refracted by the front surface of the sphere along a line approximately parallel to the ray of light from the source. In other words, a portion of the incident light is retro-reflected back to the approximate position from which it emanated.

Glass beads of a refractive index of between 1.7 and 2.0 are usually used. However, beads of a very high refractive index, in the order of about 2.9, may also be used, with their front surfaces embedded in a transparent plastic layer which may either be uncoloured to provide substantially white retro-reflection, or which may be coloured with a transparent tinting medium to provide retro-reflection of any desired colour. This transparent layer, which usually has a flat exposed surface, is in intimate contact with the front surfaces of the beads but by virtue of their high refractive index the resultant refraction at the interface is such as to provide the required refraction of the light within the beads. Beads of very high refractive index are however considerably more expensive than those of lower refractive index.

It will be clear that the amount of light retro-reflected will be dependent, among other factors, on the extent of diffusion of the light which strikes the back surface of the sphere.

Various methods of preventing incident light which passes through the beads from being lost by passing beyond the beads into a light-diffusing substrate are known. The known methods include coating parts of the surfaces of the beads with a reflective material such as a reflective paint or a metal such as silver or aluminium, the beads being so orientated in the final product that the reflectively coated part is embedded in a backing member while the uncoated part receives the incident light.

The process of coating a part of a glass bead which may be of a diameter of the order of a few microns to 125 microns or even more is by no means simple. Usually the entire surface of the beads is initially coated and later, after the beads have been partly embedded in the backing member, the reflective coating is removed chemically from the exposed parts of their surfaces that project from the backing member. This is an expensive and laborious procedure.

Another proposal has been described in U.S. Pat. No. 3,005,382 to Weber, which is concerned with the special problem of making a retro-reflective material which is also light-transmitting, and in which the beads are spaced relatively widely apart and the interstices between them are occupied by transparent material. Naturally this product is not as highly retro-reflective as one in which the beads are closely packed. The proposal described in U.S. Pat. No. 3,005,382 entails embedding the beads to about 40% of their diameter in a polyethylene coating on a substrate which is heated to a temperature at which the polyethylene is tacky, and thereafter applying a thin coating of aluminium to the projecting parts of the beads. A backing member in the form of a sheet coated with a layer of adhesive considerably thicker than the upper limit of the nominal diameter range of the beads is then brought into contact with the reflective coating on the beads and pressure is applied until the beads are embedded to about 25% of their diameter in the adhesive on the backing member. The polyethylene coated substrate is then stripped away. Stripping has the effect in these circumstances that substantially all the aluminium in the interstices between the beads remains on the polyethylene-coated substrate. This is the effect desired in order that the final product should be as light-transmissive as possible.

The procedure described in U.S. Pat. No. 3,005,382 is unsuitable where a high degree of etro-reflectivity is the chief objective and light-transmission is not required. It also has the drawback that heating of the polyethylene requires close temperature control and complicates the manufacturing process.

Moreover there is the considerable difficulty that the pressure applied to the backing member and beads to cause the beads to become inbedded to the required depth in the adhesive coating on the backing member requires accurate control. What is more, if the adhesion of the beads to the tacky coating on the carrier sheet is unduly strong, some of the beads will remain on the carrier sheet and not be transferred to the backing member. This leads to wastage of beads and to a technically inferior product.

An object of the invention is to provide a method of making highly retro-reflective bodies without necessarily using beads of very high refractive index and without having to resort to the coating of the entire surface of a bead with a reflective material and later removing a part of the reflective coating, and also without having difficulties of the kind mentioned above in transferring the beads from a carrier sheet to a backing member.

Another object of the invention is to provide a method of making retro-reflective material which can be supplied in suitable form, for instance in sheet form, to users who may cut it to suitable shapes for their own purposes and themselves apply it to surfaces which they wish to render retro-reflective.

A further object is to provide a method of making retro-reflective bodies in which the retro-reflectivity is not uniform over the whole surface of the body but is present in some pattern in which highly retro-reflective areas are separated or surrounded by spaces in which there is reduced or zero retro-reflectivity.

Other objects will emerge from the description which follows.

According to the invention a method of making a retro-reflective body comprises the steps of applying transparent glass beads in a monolayer to a tacky coating formed on a carrier sheet so that a part of the surface of each bead is embedded in the tacky coating and the remaining part is exposed, coating the exposed parts of the beads at least partially with a reflective material, bringing the reflectively coated surfaces of beads on the carrier sheet into contact with a backing member coated with an adhesive of a material different from that of the backing member itself, applying pressure to the contacting surfaces so that the reflectively coated surfaces of the beads become embedded in the adhesive coating, and stripping the carrier sheet off the backing member; the thickness of the adhesive coating on the backing member being less than the nominal diameter range of the beads, and the thickness of the tacky coating on the carrier sheet being less than that of the adhesive coating on the backing member.

The tacky coating on the carrier sheet and the adhesive coating on the backing member may conveniently be of the same material. The tacky coating is preferably tacky at ambient temperatures up to 45°C and the beads are preferably applied to the carrier sheet at such ambient temperatures.

The invention also includes, for application to a surface which is to be rendered retro-reflective, a structure comprising a carrier sheet provided on one side with a coating which is relatively strongly adherent to the carrier sheet and in which is embedded a monolayer of transparent glass beads, a part of each bead projecting from the coating and such part being covered at least partially by a layer of of a reflective material which is relatively strongly adherent to the glass beads, the coating being relatively weakly adherent to the glass beads and being tacky at ambient temperatures up to 45°C.

The coating in this aspect of the invention may for instance by a relatively thin layer of a comparatively strong adhesive, such as an acrylic-type adhesive, or alternatively a relatively thick layer of a comparatively weak adhesive. In the former case the comparatively weak adhesive of the coating to the beads arises from the fact that the coating engages only a small part of the surface area of the beads.

The upper temperature of 45° C mentioned above is approximately the upper limit of ambient temperatures encountered in factories in hot countries. By carrying out the invention at temperatures not greater than 45°C special measures to control temperature for the manufacturing process can be avoided.

This structure may also include a coating of an adhesive material on the reflectively coated beads, and a release sheet covering such adhesive and being relatively weakly adherent to it.

In either case, once the structure has been attached to the surface to be rendered retro-reflective, the carrier sheet is stripped away to leave the uncoated surfaces of the beads exposed to incident light.

The beads may be clear or transparently coloured. The backing sheet or the adhesive coating on it, or both, may be transparent or opaque and of a similar colour to or different colour from the beads.

Glass beads of various dimensions may be used, although preferably the nominal diameter ranges are within the overall limits of about 30 to 90 microns.

The reflective index of the beads should preferably be in the neighborhood of 1.8 to 2.0 although satisfactory results may be obtained with beads of other refractive indices. If beads of a refractive index in the order of 2.4 to 2.9 are used, a clear or transparently tinted plastic lor lacquer surface may be applied directly on to the front of the beads as a covering film and good reflectivity may still be achieved.

Various types of adhesive may be used for the adhesive coating on the backing member and for the tacky coating on the carrier sheet, and specific types will be mentioned below in the examples. Another commercially available material suitable in at least some cases as the coated carrier sheet is sold in the Republic of South Africa under the trade name PT Low Track Peelable Sealing Tape, manufactured by Sellotape and Adhesive Products (Proprietary) Limited. It incorporates a solvent based rubber type adhesive.

EXAMPLE 1

In an example, transparent glass beads of a refractive index of about 1.9 and a nominal diameter range of 50 – 90 microns were applied on to a carrier sheet at a room temperature of 20°C, the carrier sheet having a coating of a material that was tacky at room temperature, in such a manner as to form a closely packed monolayer. The tacky surface comprised an arcylic-type adhesive, coated on to a polyvinyl chloride carrier sheet in a layer of approximately 10 microns thickness.

Thereafter the exposed parts of the beads, approximately 50% of their surface, were coated to a thickness of approximately 0.25 micron with a reflective metallic coating (in this example aluminium) by the vacuum coating process. A silver coating can alternatively be applied by the two-component spray gun system.

The reflectively coated parts of the beads, still adhering to the tacky coating on the carrier sheet, were then pressed into contact with an adhesive surface on a backing sheet until the reflective aluminium coating was firmly in contact with the adhesive on the backing sheet.

Although the backing sheet may in some applications be coated on its front surface only with a suitable strong adhesive, the sheet used in the example was coated on both its front and rear surfaces, a release paper being provided in contact with the adhesive on the rear surface. The backing sheet of the example was a polyvinyl chloride product sold in the Republic of South Africa under the trade name Sellotape 4405 Double-Sided Adhesive Tape, manufactured by Sellotape and Adhesive Products (Proprietary) Limited. The adhesive on both its sides is of an acrylic type, applied in a layer of about 25–30 microns thickness. Various other types of adhesive-coated sheeting may be used instead.

The applicant has found it useful to use the same solvent-based acrylic type adhesive for both the carrier sheet and the backing member, the coating on the carrier sheet being considerably thinner than that on the backing member. With an acrylic-type adhesive, a 10-micron layer on the carrier sheet is adequate when a 25–30 micron layer is used on the backing member.

Because the adhesive coating on the backing member is of lesser thickness than the nominal diameter range of the beads, substantial pressure can be applied to embed the beads in the adhesive coating. Even if the beads penetrate through the full thickness of the adhesive coating, they will not be completely surrounded or swamped by the adhesive. The thickness of the adhesive coating is preferably, as in this example, slightly less than one half of the diameter of the beads in the midpoint of the nominal size range, so that the bulk of the beads are embedded in the adhesive to a depth of up to 50 percent of their surface area.

EXAMPLE 2

In another example, retro-reflective material was made in the form of the adhesively coated carrier sheet with the mono-layer of glass beads adhering to it, hemispherically coated with a reflective metallic coating as described in the previous example. Such product, which can conveniently be marketed in sheet or roll form or cut to shapes such as numbers or letters of the alphabet, is designed to be subsequently applied to a backing member in situ by means of a suitable adhesive applied to the front surface of the backing member (such as a sign, gatepost or the like) which it is desired to render retro-reflective. An adhesive which has been found suitable for this purpose is a two-component epoxy glue sold in the Republic of South Africa under the trade name Pratley Clear Epoxy Quick-Set Glue. Various other types of adhesive may be used instead.

In both examples after a good bond has been established between the reflectively coated surfaces of the beads and the adhesive surface on the backing member, the carrier sheet is stripped or removed, leaving the beads partially embedded in and bonded on to the backing member. The completed structure is highly retro-reflective.

Cover sheet

In order to prevent a loss of retro-reflectivity if the surfaace containing the exposed parts of the beads is moistened and a film of water is created over the beads, a cover sheet of transparent material, whether clear or of the colour which it is required to reflect, can be located over that surface.

If a cover sheet is to be used, the reflectively coated beads may be transferred from the carrier on to the adhesive coating of the backing sheet in certain selected areas only, thus leaving spaces of the adhesive surface of the backing sheet uncoated with beads. These spaces are then used for the purpose of adhering the cover sheet to the backing sheet, thus forming a strong product in which certain areas only are retro-reflective.

The cover sheet may comprise any suitable material, for example, clear or transparent coloured vinyl sheet. For outdoor use biaxially oriented methyl methacrylate is preferred.

According to one aspect of the invention, dependent on the type of finished product which it is intended to manufacture, the carrier sheet bearing the reflectively coated glass beads is cut into suitable sizes and shapes, for example strips, triangles, circles, such cut piece or pieces then being placed with the reflectively coated beads in contact with an adhesively coated backing sheet of larger area than the cut carrier sheet. A layer of release paper is placed over parts of the adhesive surface of the backing sheet not covered by the carrier sheet, the whole then being pressed together with sufficient pressure to bond the reflectively coated parts of the beads to the backing sheet. The pressure is then relieved and the release paper is removed. Thereafter the cut piece of carrier sheet is stripped off, leaving the reflectively coated beads bonded on to the backing sheet and forming a pattern conforming to the shape of the cut piece or pieces, with the clear uncoated glass surface of the beads exposed. The product thus formed is highly retro-reflective in the areas where the beads have been bonded on to the backing sheet, while the spaces where the beads have not been provided retain the original adhesive coated surface of the backing sheet. Such adhesively coated spaces may be used for adhering the backing sheet to a transparent cover sheet or other transparent object.

Use of Stencil

Further according to the invention, a stencil or screen, preferably cut from sheet material, may be placed between the reflectively coated beads on the carrier sheet and the adhesive surface of the backing member. The stencil or screen is intended to form an insignia or pattern such as a grid of squares, triangles or hexagons, or a warning sign, advertisement, number plate or other design. The carrier sheet, stencil and adhesive surface of the backing member are pressed together, resulting in the glass beads being bonded on to the backing member over the open areas of the stencil but of course on the solid areas of the stencil they do not come in contact with the adhesive layer on the backing sheet and thus in these areas the beads remain attached to the carrier sheet.

After the pressure has been removed, the carrier sheet is stripped, and thereafter the stencil is pulled away from the adhesive layer of the backing sheet. The beads form a retro-reflective product in the areas where the stencil was open, leaving the original adhesive coating on the other areas of the backing member. Such adhesive coated areas may be adhered to a transparent cover sheet or other transparent objects. If the retro-reflective body is a number plate for a vehicle, the adhesive may be pigmented and of a different colour from the beads, the stencil defining the letters and numbers of the plate. For instance, the adhesive may be black and the beads yellow, the cover sheet being clear. On a road sign, on the other hand, the adhesive may be white and the beads of another colour such as blue, green or red, the stencil defining the words or symbols which the sign is to carry.

The stencil will normally be of substantially the same thickness as the combined thickness of the monolayer of beads and their reflective coating.

In a variation of this theme, the stencil is formed of a material such as polyvinyl chloride, and instead of being removed from the backing sheet as described above, it is left attached to the adhesive surface of the backing sheet, usually for bonding to a cover sheet. In such case the stencil may have been coated before use with a suitable dry adhesive capable of being activated by the application of a solvent or by the application of heat or other activating means. Alternatively, the stencil may be uncoated but is activated by applying a solvent capable of tackifying the material from which the stencil is made. The stencil may even be made of a material capable of being heat fused. In the case of a number plate, the stencil takes the form of the registration letters and/or numbers of the vehicle, and can be of any suitable opaque material of a colour (e.g. black) which contrasts strongly with the color of the retro-reflective beads used (e.g. yellow).

A transparent cover sheet may be applied over the stencil, to adhere to it by means of pressure, applied in conjunction with any of the abovementioned methods of adhesion.

Application of Pressure

To bond the reflectively coated beads on the backing member after the carrier sheet has been brought into contact with the backing member, with or without the stencil or screen interposed between them as described above, pressure may be applied by various means. Such means may consist of two resiliently covered pressure plates, or one pressure plate may be smooth and hard and the other pressure plate may be resiliently covered. Another and preferred method is to apply air or other fluid pressure on to one side of the structure, the other side being restrained against the smooth, hard surface of a pressure plate.

Alternatively pressure may be applied by means of rollers, or by subjecting the structure with its edges sealed to pressure in a pressurized vessel, or by passing it through a pressure column such as a mercury column which may be heated.

In cases where areas of the adhesively coated surface of the backing member may come in contact with the pressure plate or roller, adherence may be avoided by the use of a sheet of release paper or other non-stick surface such as, for example, polytetrafluoroethylene.

The step of bonding the backing sheet (where the backing member is in sheet form) to the cover sheet may be carried out by various pressure application methods or devices, including those mentioned above. For example, the cover sheet may be placed in contact with a smooth hard flat surface and the backing sheet with the beads bonded to its surface may then be placed in contact with the cover sheet in such a manner that the exposed adhesive areas of the backing sheet come in contact with the cover sheet, and thereafter the required pressure may be applied by one of the procedures mentioned above.

Retro-reflective products having an attached transparent cover sheet may, as mentioned above, be characterised by the absence of glass beads in certain pattern areas where the adhesive coated areas of the backing sheet adhere to the transparent cover sheet. The application of pressure as described above results in some cases in the backing sheet being deformed so as to press the unbeaded adhesively coated areas of the backing sheet into intimate contact with the cover sheet. This results in a product with a flat covering surface and comprising a series of hermetically sealed compartments. This product can be cut to any desired size or shape and only any incomplete compartment at the edge of the retro-reflective body might lose its retro-reflectivity if exposed to moisture.

A hot-melt type adhesive may be used on the backing sheet. Here the same procedure as already described may be used both to transfer the beads from the carrier sheet to the backing member, and also to adhere the backing member to the cover sheet, except that in addition the required degree of heating must be applied during the process.

Where hot-melt type adhesives are used, the air or fluid pressure method is particularly suitable as the heat can be readily applied to the fluid without difficulties arising as sometimes occur where a heated solid pressure member is used in conjunction with a resiliently covered pressure plate or roller. The smooth hard pressure plate should preferably be covered with a non-stick surface.

Selective Application of Adhesive

Also according to the invention, adhesive may be applied to the backing member by means of a stencil or by means of a silk screen process or by other means so that the backing member is adhesively coated in selected areas only, where it is desired to adhere the glass beads, the remaining areas being uncoated with adhesive. Thereafter the beads may be transferred from the carrier sheet to the backing member in the adhesively coated areas only, the beads in the other areas remaining on the carrier sheet when it is stripped.

The backing member so formed with glass beads attached only to certain areas may thereafter be attached to a transparent cover sheet of a material which fuses together with that of the backing sheet by the following process. A smooth hard pressure plate, preferably with a non-stick surface, is provided. A transparent cover sheet is placed in contact with the smooth surface of the pressure plate, and the backing member is then placed in contact with the cover sheet.

Air or other fluid pressure is applied to the rear surface of the backing member. The fluid is heated either before or during this process to an appropriate temperature to ensure fusion between the cover sheet and the backing member. Alternatively the pressure plate may be so heated, or both the fluid and the pressure plate.

This process results in the backing member being deformed so as to come into contact, over those areas where ther are no beads present, with the cover sheet, and to fuse with it into an integral unit. This results in a retro-reflective body having a series of hermetically sealed compartments and such body can be cut to any desired size or shape.

A particularly suitable thermoplastic material for use in this process as a cover sheet is methyl methacrylate.

Other Modifications

Retro-reflective sheeting may be manufactured as herein described but with the addition of a thin transparent tacky surface on the outside face of the cover sheet, and such tacky surface may be protected with a sheet of release paper. This type of product may, for example, be used as a warning reflector on vehicles by removing the release sheet and pressing the reflective material on to the inside surface of the windscreen, rear window or side windows of the vehicle.

An alternative arrangement for the windscreen or other window of a vehicle made of laminated lass (generally two glass sheets between which a sheet of a clear plastics material is located) is to place a retro-reflective edge strip within the structure of the glass laminate. In a preferred form two layers of relatively thin plastics material are located between the two glass layers, and in one of the layers of plastics material an opening is cut initially for form a strip around the edge of the pane. Into this opening a monolayer of glass beads, hemispherically coated with a reflective material, is placed, preferably by transfer from a carrier sheet, and supported on an adhesive backing which may be a coating applied to the sheet of plastics material. The outer layer of glass is applied directly to the substrate so formed, acting as a cover sheet for the retro-reflective edge strip. The thickness of the beads and of the intermediate plastics layers will be so chosen in relation to the size of the beads that no extra thickness will exist in the completed glass pane in the edge strip. No extra internal stresses will then exist in the pane as a result of the retro-reflective strip.

For particular purposes, the daylight appearance of the retro-reflective materials described above can be modified by the addition to the transparent beads of a proportion of suitably brightly colored opaque beads of approximately the same size range as the transparent beads. The opaque beads may be of a plastics material but may also comprise glass beads opaquely coated in the required colour. Such coloured beads should be thoroughly mixed with the transparent beads before they are applied to the carrier sheet. The proportion of opaque to transparent beads may be in the range 10 – 50% depending upon the effect required. Naturally the retro-reflectivity is reduced by a factor which is dependent upon the proportion of opaque to transparent beads. If for instance yellow transparent glass beads are used to produce retro-reflectivity and are hemispherically coated with aluminium the daylight appearance of the finished body will be a dull yellowish grey. This colour can be brightened by using a proportion of opaque yellow beads among the transparent beads.

Where adhesive areas are provided on the backing member for attachment to a cover sheet, the cover sheet iself may carry adhesive in selected areas. Where the adhesive on the cover sheet contacts the exposed surfaces of the beads it forms a film over them conforming to their curvature. In this film the retro-reflectivity will be reduced to a greater or lesser extend, depending on the refractive indices of the material of the adhesive and of the beads. Unless beads of very high refractive index are used, retro-reflectivity in this film will usually be negligible.

Another modification provides that the cover sheet should carry a pattern of pigmented adhesive of a colour contrasting with that of the remainder of the structure. This modifies the daylight appearance of the structure and destroys retro-reflectivity in the areas of the pigmented adhesive.

In a further modification, where a pattern of non-retro-reflective areas combined with retro-reflective areas is desired in the final structure, the backing member is covered initially over its whole surface with an adhesive which is normally inert and which must be activated, for instance by pressure or by a solvent, when its adhesion is needed. For the initial application of the beads on the carrier sheet the adhesive on the backing member is activated only in the areas required to be retro-reflective. The remaining areas are activated later to receive a cover sheet.

Still further, a multicolour retro-reflective body may be made by applying the beads to the backing member in two or more stages. The first stage involves applying beads of a first colour to selected areas of the backing member and in a second stage beads of a different colour are applied to other areas. Further colours may be applied in the same fashion. Alternatively, the beads might be applied in different stages to the carrier sheet and transferred in a single operation from it to the backing member.

I claim:

1. A method of making a retro-reflective body comprising the steps of applying transparent glass beads in a monolayer to a tacky coating formed on a carrier sheet so that a part of the surface of each bead is embedded in the tacky coating and the remaining part is exposed, coating the exposed parts of the beads at least partially with a reflective material, bringing the reflectively coated surfaces of the beads on the carrier sheet into contact with an adhesive coating on a surface of a backing member, applying pressure to the contacting surface so that the reflectively coated surfaces of the beads become embedded in the adhesive coating and stripping the carrier sheet off the backing member, with the improvement, that the pressure applied to the contacting surface is sufficient to cause the beads to be embedded in the full thickness of the adhesive coating, that the thickness of the adhesive coating on the backing member is less than the nominal diameter range of the beads, and that the thickness of the tacky coating on the carrier sheet is less than that of the adhesive coating on the backing member.

2. The method of claim 1 in which the thickness of the adhesive coating on the backing member is not greater than one half of the midpoint of the nominal diameter range of the beads.

3. The method of claim 1 in which the adhesive coating on the backing member and the tacky coating on the carrier sheet are of the same material.

4. The method of claim 1 in which the tacky coating on the carrier sheet is tacky at ambient temperatures up to 45°C and the monolayer of beads is applied to the carrier sheet at an ambient temperature not greater than 45°C.

5. The method of claim 1 in which, after stripping the carrier sheet, the surface of the retro-reflective body is covered with a transparent cover sheet; with the improvement that glass beads are embedded in the surface of the adhesive coating on the backing member is selected areas separated by spaces containing no beads, and the cover sheet is caused to adhere to the backing member in such spaces.

6. The method of claim 5 in which the adhesive on the backing member is normally inactive, and including the steps of activating it in selected areas in a first stage to receive the glass beads, and at a later stage in other areas to adhere to the cover sheet.

7. The method of claim 5 in which the tacky coating, the monolayer of beads and the reflective material are provided on substantially the whole surface of the carrier sheet, and including the steps of interposing a stencil between the carrier sheet and the adhesive coating on the backing member before they are brought into contact, the stencil defining an area on the backing member on which it is desired to have the glass beads and a space in which they are to be absent.

8. The method of claim 7 in which the stencil is of a material that is relatively weakly adherent to the adhesive coating on the backing member, and including the step of removing the stencil before the cover sheet is applied, the cover sheet being caused to adhere directly to the adhesive coating in the spaces previously occupied by the stencil.

9. The method of claim 7 in which the stencil is left in place on the adhesive coating of the backing member, and including the step of causing the cover sheet to adhere to the surface of the stencil and thereby to the backing member.

10. The method of claim 9 in which the stencil is provided with an adhesive coating on its surface in contact with the cover sheet.

11. The method of claim 10 in which the adhesive on the stencil is a dry adhesive, and including the step of activating such adhesive before the cover sheet is applied.

12. The method of claim 8 in which the materials of the stencil and cover sheet are fusible together, and in which the cover sheet is caused to adhere to the stencil by heating them to cause fusion.

13. The method of claim 6 in which the stencil is of sheet material.

14. The method of claim 7 in which the retro-reflective body is a number plate and the stencil is an insignia comprising the number for the plate.

15. The method of claim 7 in which the stencil comprises a series of discrete stencil elements each defining a space in which glass beads are intended to be absent in the retro-reflective body and each space is wholly surrounded by an area in which glass beads are intended to be present.

16. The method of claim 1 in which, after the reflective material has been provided on the beads on the carrier sheet but before the beads are brought into contact with the adhesive coating on the backing member, the carrier sheet is trimmed to a desired shape, a margin of adhesive material surrounding such shape being provided on the backing member, and including the step of attaching a margin of a cover sheet to such margin of the adhesive coating.

17. The method of claim 5 in which the adhesive coating is applied to selected areas of the backing member separated from spaces in which no adhesive is present and in which, when the carier member is stripped off the backing member, the glass beads and reflective material in the spaces remain attached to the carrier sheet, and in which a cover sheet is applied to the retro-reflective structure and the cover sheet is caused to adhere directly to the backing member in the spaces where no adhesive is present on the backing member.

18. The method of claim 17 in which both the backing member and the cover sheet are of a plastics material and in which heat is applied to them at least in such spaces to cause them to fuse together.

19. The method of claim 18 in which the cover sheet is placed in contact with a flat surface and heat is applied to the backing member to cause it to fuse to the cover sheet, the backing member being caused to deform in such spaces in order to form surrounding frames for compartments in which glass beads are contained.

20. The method of claim 1 in which pressure is applied to the retro-reflective body during its formation by a pressurised fluid applied directly to at least one side of the retro-reflective body.

21. The method of claim 20 in which the entire retro-reflective body is subjected to fluid pressure and in which the edges of the body are sealed before the pressure is applied.

22. The method of claim 20 in which the fluid is heated and is applied to a material of the retro-reflective body that is fusible with a juxtaposed material, the heating taking place at a temperature leading to fusion of these materials.

23. The method of claim 1 in which non-reflective insignia are placed over selected areas of the retro-reflective body and secured to it to overlie the glass beads in such areas.

24. The method of claim 23 in which the retro-reflective body is a number-plate for a motor vehicle and the insigia comprise a number.

25. The method of claim 23 in which the insignia are attached by means of adhesive to the retro-reflective body.

26. The method of claim 23 in which the insignia are caused to adhere to a surface of a cover sheet which is located over the retro-reflective body.

27. The method of claim 1, including the step of forming a layer of an adhesive material on selected areas of the surface of the retro-reflective body in which areas the glass beads are exposed, and securing a cover sheet to such a body with the cover sheet attached to it by the adhesive in such areas.

28. The method of claim 1 in which a cover sheet is applied to the retro-reflective body and in which adhesive is applied in selected areas to the cover sheet before the cover sheet is fixed to the retro-reflective body.

29. The method of claim 28 in which the selected areas on the cover sheet are lines which intersect lines of adhesive provided on the retro-reflective body.

30. The method of claim 27 in which the adhesive between the cover sheet and the retro-reflective body is pigmented to modify the daylight appearance of the body.

* * * * *